H. L., A. E. & H. O. SHORT.
WHEELED CARRIAGE FOR FLYING MACHINES.
APPLICATION FILED JULY 23, 1910.
984,497.
Patented Feb. 14, 1911.
3 SHEETS—SHEET 3.
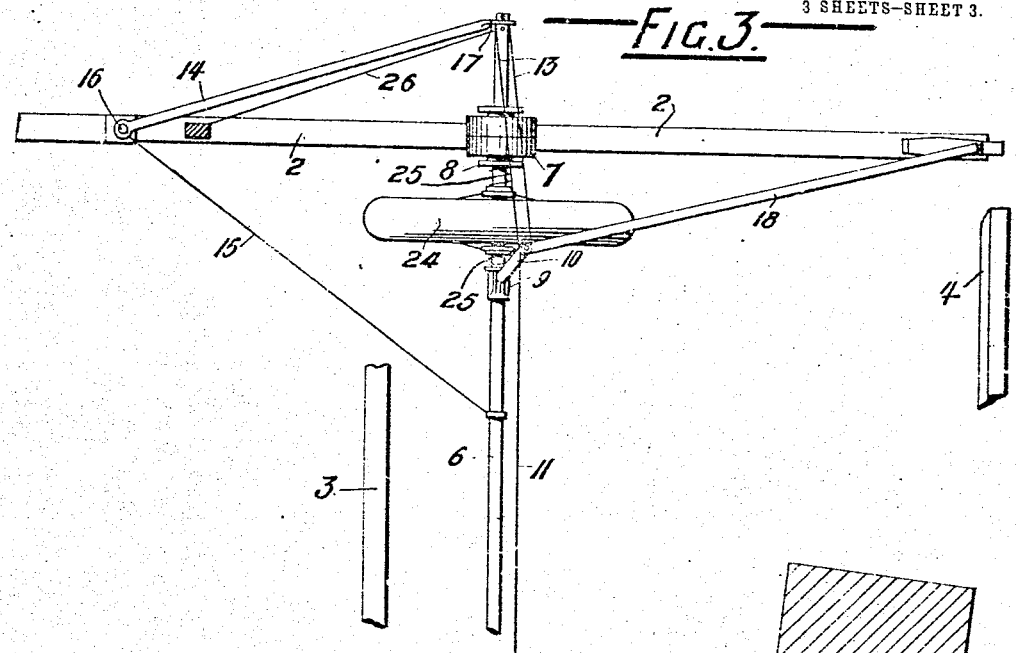
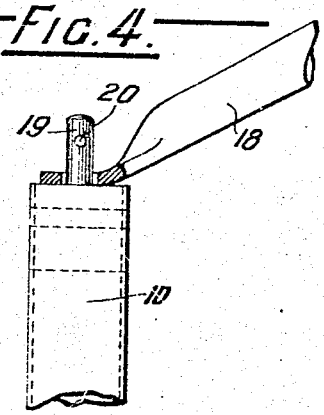
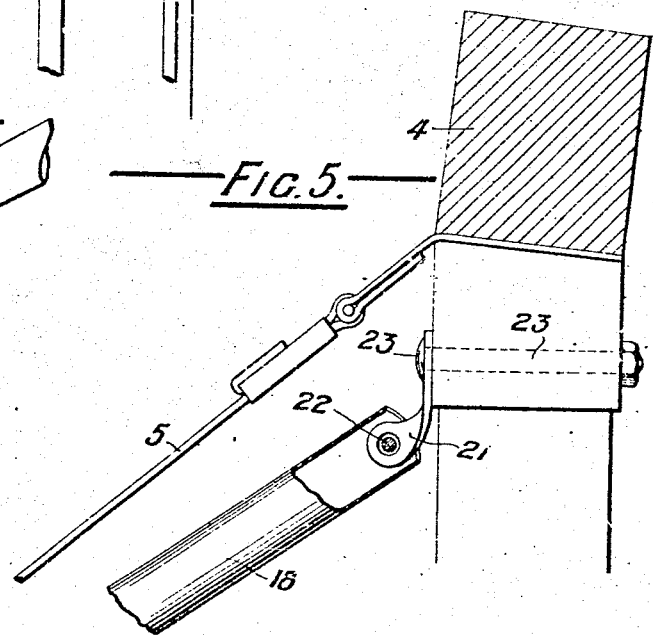
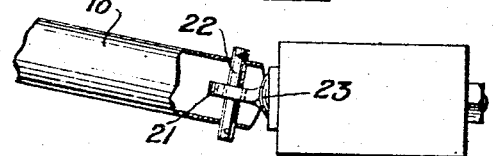

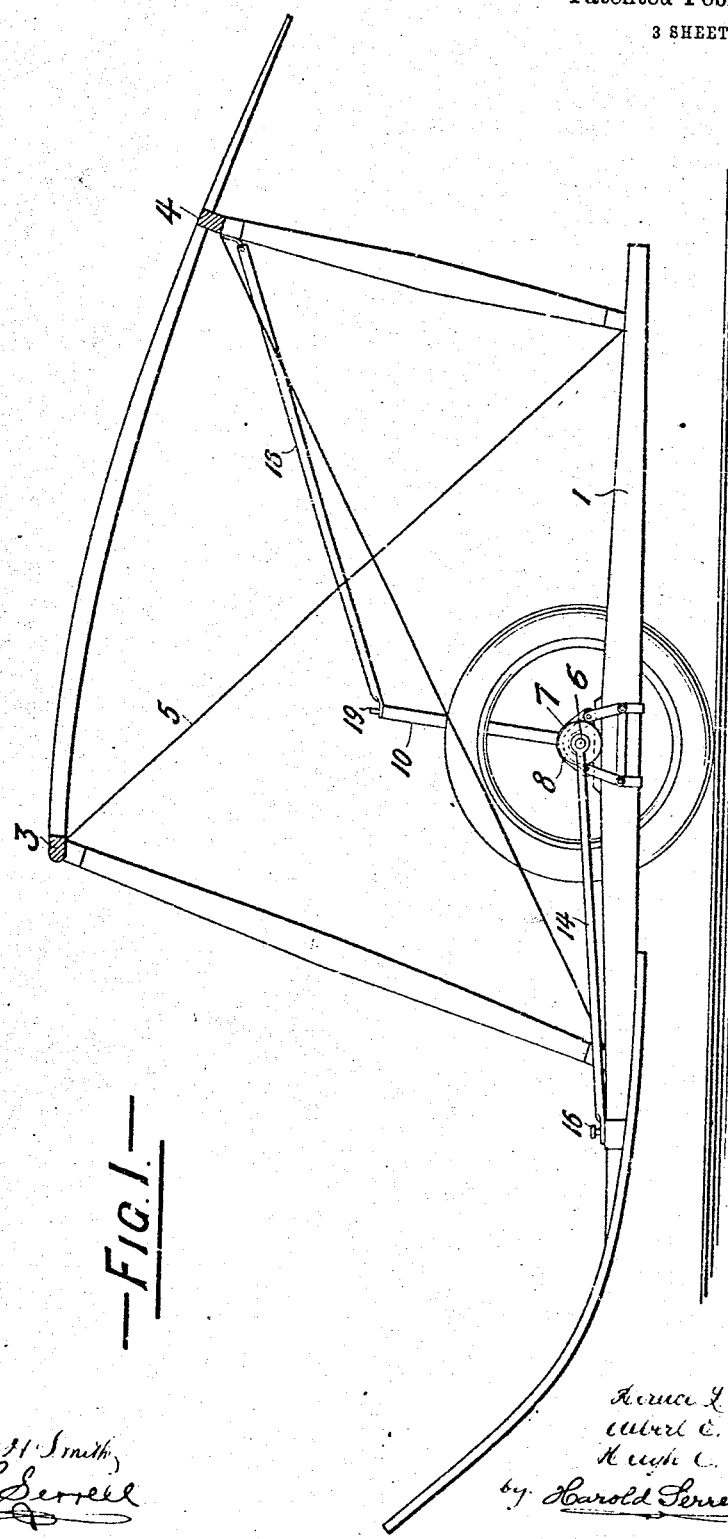

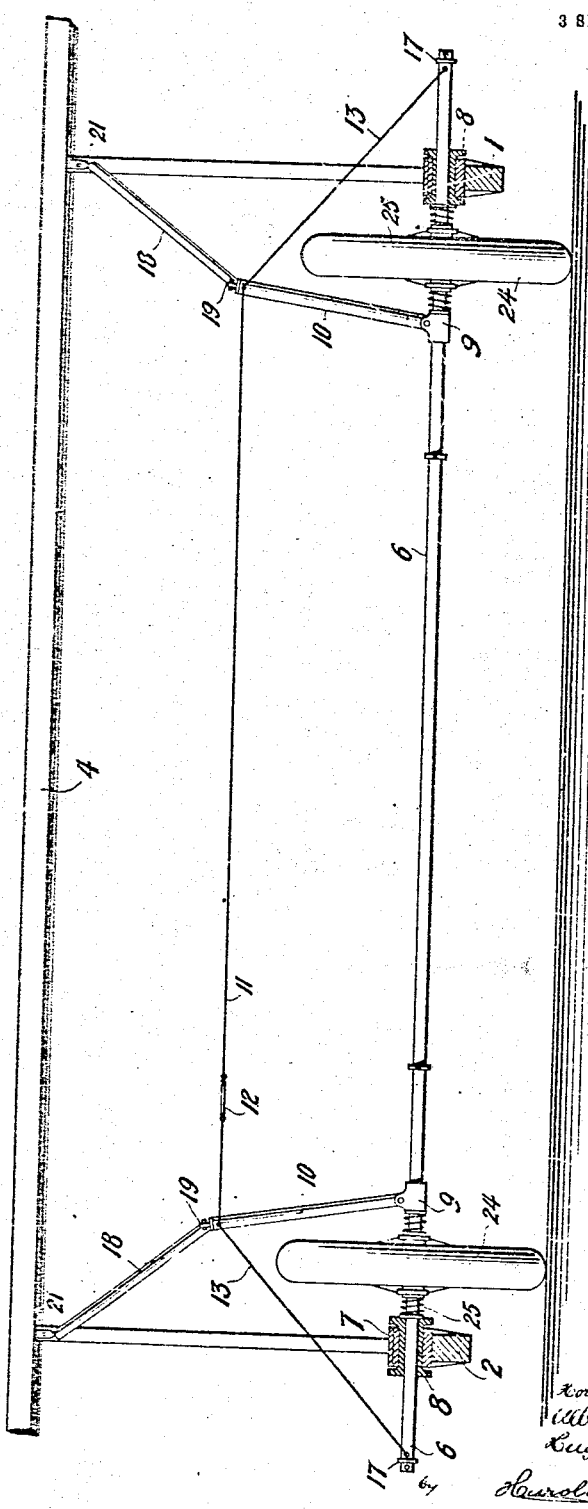

UNITED STATES PATENT OFFICE.

HORACE LEONARD SHORT, ALBERT EUSTACE SHORT, AND HUGH OSWALD SHORT, OF BATTERSEA PARK, LONDON, ENGLAND.

WHEELED CARRIAGE FOR FLYING-MACHINES.

984,497.  Specification of Letters Patent.  Patented Feb. 14, 1911.

Application filed July 28, 1910. Serial No. 574,214.

*To all whom it may concern:*

Be it known that we, HORACE LEONARD SHORT, ALBERT EUSTACE SHORT, and HUGH OSWALD SHORT, subjects of the King of Great Britain, residing at Battersea Park, in the county of London, England, have invented a certain new and useful Improved Wheeled Carriage for Flying-Machines, of which the following is a specification.

This invention relates to flying machines which are dependent upon attaining a certain speed through the atmosphere in order to effect flight, and particularly refers to the construction of a wheeled carriage in combination with skids which are employed for landing purposes, and in which combination the advantages incident to the use of both wheels and skids are maintained.

Wheels have heretofore been combined with skids on flying machines, but the object of our invention is to provide a construction which shall be of great strength, light weight, shall not involve the employment of numerous or heavy parts, and which does not offer any considerable amount of head resistance, while the chassis or wheel framework is so constructed that it has great flexibility and is therefore capable of enduring the shocks and strains to which it may be subjected to in use, without damage.

In carrying out this invention we employ a long tubular axle which passes transversely over and laterally beyond the skids about the central part of their length and is held thereto by india-rubber bands or other flexible connections, the said axle being non-revoluble and carrying two road wheels which are free to revolve thereon and to have a certain amount of lateral or sideway motion against the action of helical springs located on the said axle.

According to this invention, this long tubular axle is trussed or braced by means of struts, the lower ends of which are mounted upon the axle and extend vertically in a plane at about right angles to the ground and are connected at their upper ends by tension wires extending from strut to strut and to the extending ends of the said axle; in order to support the axle against rearward motion, stays extend therefrom to the forward portion of the skids, and struts also extend from the upper ends of the vertically extending axle struts to the upper rearward portion of the framework of the skids, so as to maintain the axle struts in their vertical or approximately vertical positions. The joints of the struts extending from the upper ends of the axle struts to the skid framework are loosely made or have the character of universal joints, as also where rigid stays are used extending from the ends of the axle to the forward ends of the skids, the jointing is also of a somewhat loose or flexible character, and when such forwardly extending stays are of flexible material such as steel wire, the axle itself is free to have some endway motion.

Figure 1 of the drawings shows, in sectional end elevation, the skid framework with the wheel chassis combined therewith constructed according to our invention, and Fig. 2 is a front elevation of the same. Fig. 3 is a plan view of a portion of one of the skids and the wheel chassis adjacent thereto. Fig. 4 shows, in sectional elevation, a construction of loose joint connecting the rearwardly extending strut to one of the vertical struts. Fig. 5 shows a construction of joint for the rearward end of the said strut, and Fig. 6 is a sectional plan view of the joint shown at Fig. 5.

Referring to Figs. 1, 2 and 3, the skids 1 and 2 which extend longitudinally of the machine parallel to each other and at a distance apart, are supported from the front spar 3 and back spar 4 of the machine and are stayed in any suitable or well known manner by for instance wire stays such as 5.

The axle 6 extends transversely of the machine passing over and beyond the said skids 1, 2 to which said axle is connected by an elastic connection composed of india-rubber bands 7, such as is shown at Figs. 1 and 2, held to the skids and passing over shouldered sleeves 8 (Fig. 2) through which the axle 6 passes, said sleeves 8 being fixed to said axle.

Fixed upon the axle 6 at a comparatively short distance from the inner face of each sleeve 8, is a collar 9, and between lugs on each collar is pivoted a tubular strut 10 extending vertically upward in a plane at about right angles with the ground, and the upper ends of these struts 10 are connected by a wire tie 11 which may be provided with any ordinary tensioning device as at 12, Fig. 2.

From the upper end of each strut, ties 13 extend to the adjacent over-hanging end of the axle 6; in the construction illustrated at Figs. 2 and 3 the ties 13 are double, and the connection of the ties 11 and 13 with the upper ends of the struts 10 may be of any convenient or well known character, as for instance the wire tie can be threaded through a hole drilled in the upper ends of the struts 10 and through a hole drilled in the ends of the axle 6, and the whole structure can be brought to the requisite tension by means of the tensioning device 12.

To support the axle 6 against rearward motion, toward each end the axle 6 is connected by stays 14, 15 to the forward part of the adjacent skids 1, 2, and where, as is illustrated, one of these stays such as 14 is of rigid character such as steel tube, the joints respectively to the skid at 16 and to the end of the axle at 17 are loose joints, so as to permit of some play; for instance the joint at 16 may consist of a pin upstanding from the skid and passing through a hole in the end of the stay 14 which is of somewhat larger diameter than the said pin, and it may be held on to the said pin by a nut or by a split pin or the like.

Instead of making the stay 14 rigid as shown, it may be composed of a flexible steel wire, whereby the axle 6 will be capable under stress of bodily having some lateral or endway movement. In the drawing, Fig. 3, there is shown an additional single wire stay 26 from the end of the axle to the forward part of the skid.

The stays 14 and 15 prevent the tubular axle from moving backward due to the force which the wheels are subjected to on landing, while also said stays permit of the axle having an angular motion, during which latter the stays 14 and 15 serve as radius arms.

The upper rearward struts 18, one of which extends from the upper end of each vertically extending axle strut to the upper and rearward part of the skid framework, are also loosely jointed to the respective parts to which their ends are attached, so as to permit of the movement of the wheel chassis and also so as to better resist damage due to shock.

At Fig. 4 is illustrated the joint of the upper strut 18 to the vertical axle strut 10 from which it will be observed that the end of the tubular strut 10 is plugged and has a projecting pin 19 over which fits the flattened end of the strut 18, the hole formed through the end of the strut 18 being larger in diameter slightly than the pin 19 and being prevented from leaving the pin 19 by a split pin or the like 20.

At Fig. 5 the joint of the rear end of the upper strut 18 to the framework 4 is illustrated, where a tongue 21 is loosely pivoted by a pivot pin 22 to the rear end of a strut 18, and this tongue 21 is hinged on a bolt 23 passing through the framework.

The wheels 24—which may be pneumatic tired—are mounted so as to be free to revolve upon the axle 6, and each wheel is located between the collar 9 on the axle 6 and the sleeve 8 which is within the elastic connection, and the wheels are permitted to have endway sliding motions upon the shaft controlled by helical springs 25 in both directions.

The axle 6 is so resiliently held to the skids 2 by the indiarubber bands 7, that the weight of the machine will normally be supported upon the wheels 24 without the skids 1, 2 contacting with the ground, but upon the machine descending with some force or descending and passing over obstructions such as ditches or gullies, the skids will come into action, and shocks, which would otherwise damage a rigid supporting framework for the wheels, is taken up by the flexible construction which has been described in this specification.

What we claim as our invention and desire to secure by patent is:—

1. In a flying machine; the combination with parallelly arranged skids extending longitudinally, and framework connecting said skids to said flying machine; of a tubular axle extending transversely over and laterally beyond said skids, means for resiliently connecting said axle to the upper surfaces of said skids to permit of upward motion of said axle relatively to said skids, road wheels carried and freely revoluble on said axle adjacent to said skids, a vertically extending axle strut adjacent to each wheel, means for connecting the lower ends of said axle struts to said axle, a tie connecting the upper ends of said axle struts and extending to and connected with the outer ends of said axle, means for tensioning said tie, rearwardly extending struts connecting the upper ends of said axle struts to the rearward framework of said skids to maintain said axle struts approximately vertical; means for flexibly connecting the forward ends of said upper struts to the upper end of said axle struts and for connecting the rearward ends of said upper struts flexibly to said skid framework, and stays connected to said axle and extending and connected to the forward portion of said skids to support said axle against rearward motion, substantially as set forth.

2. In a flying machine; the combination with parallelly arranged skids extending longitudinally, and framework connecting said skids to said flying machine; of a tubular axle extending transversely over and laterally beyond said skids, means for resiliently connecting said axle to the upper surfaces of said skids to permit of upward motion of said axle relatively to said skids, road wheels revoluble and capable of endway motion on said axle, one located adjacent to the inner face of each skid, means for resiliently limiting the endway motion of each wheel upon the axle, a vertically extending axle strut adjacent to each wheel, a collar fixed on the axle adjacent to each wheel, means for connecting the lower ends of said axle struts to said collars, a tie connecting the upper ends of said axle struts and extending to and connected with the outer ends of said axle, means for tensioning said tie, upper rearwardly extending struts to flexibly connect the upper ends of said axle struts to the rearward framework of said skids to maintain said axle struts approximately vertical, and stays connected to said axle and extending and connected to the forward portion of said skids to support said axle against rearward motion, substantially as set forth.

3. In a flying machine; the combination with parallelly arranged skids extending longitudinally, and framework connecting said skids to said flying machine; of a tubular axle extending transversely over and laterally beyond said skids, means for resiliently connecting said axle to the upper surfaces of said skids to permit of upward motion of said axle relatively to said skids, road wheels revoluble and capable of endway motion on said axle, one located adjacent to the inner face of each skid, means for resiliently limiting the endway motion of each wheel upon the axle, a vertically extending axle strut adjacent to each wheel, a collar fixed on the axle adjacent to each wheel, means for connecting the lower ends of said axle struts to said collars, a tie connecting the upper ends of said axle struts and extending to and connected with the outer ends of said axle, means for tensioning said tie, upper rearwardly extending struts to flexibly connect the upper ends of said axle struts to the rearward framework of said skids to maintain said axle struts approximately vertical, a rigid stay flexibly connected to and extending diagonally from each outer end of said axle forwardly to the respective skid adjacent to said axle end, means for flexibly connecting the forward end of said rigid stay to said skid, and a flexible diagonally extending tension stay for each end of said axle connected to said skid at one end and to said axle at its other end to support said axle against rearward motion, substantially as set forth.

4. In a flying machine; the combination with parallelly arranged skids extending longitudinally, and framework connecting said skids to said flying machine; of a tubular axle extending transversely over and laterally beyond said skids, means for resiliently connecting said axle to the upper surfaces of said skids to permit of upward motion of said axle relatively to said skids, road wheels carried and freely revoluble on said axle adjacent to said skids, a vertically extending axle strut adjacent to each wheel, means for connecting the lower ends of said axle struts to said axle, a tie connecting the upper ends of said axle struts, two parallel ties at each end of said axle connecting the upper end of said axle strut to the adjacent end of said axle, upper rearwardly extending struts connecting the upper ends of said axle struts to the rearward framework of said skids to maintain said axle struts approximately vertical, means for flexibly connecting the forward ends of said upper struts to the upper end of said axle struts and for connecting the rearward ends of said upper struts flexibly to said skid framework, and stays connected to said axle and extending and connected to the forward portion of said skids to support said axle against rearward motion, substantially as set forth.

5. In a flying machine; the combination with parallelly arranged skids extending longitudinally, and framework connecting said skids to said flying machine; of a tubular axle extending transversely over and laterally beyond said skids, means for resiliently connecting said axle to the upper surfaces of said skids to permit of upward motion of said axle relatively to said skids, road wheels revoluble and capable of endway motion on said axle, one located adjacent to the inner face of each skid, means for resiliently limiting the endway motion of each wheel upon the axle, a vertically extending axle strut adjacent to each wheel, a collar fixed on the axle adjacent to each wheel, means for connecting the lower ends of said axle struts to said collars, a tie connecting the upper ends of said axle struts and extending to and connected with the outer ends of said axle, means for tensioning said tie, upper rearwardly extending struts to flexibly connect the upper ends of said axle struts to the rearward framework of said skids to maintain said axle struts approximately vertical, a rigid stay flexibly connected to and extending diagonally from each outer end of said axle forwardly to the respective skid adjacent to said axle end, means for flexibly connecting the forward end of said rigid stay to said skid, a flexible diagonally extending tension stay for each end of said axle connected to said skid at one end and to said axle at its other end to support said axle against rearward motion, and a further flexible tension stay extending from each outer end of said axle forwardly to said skid, substantially as set forth.

In witness whereof we have hereunto set our hands in the presence of two witnesses.

HORACE LEONARD SHORT.
ALBERT EUSTACE SHORT.
HUGH OSWALD SHORT.

Witnesses:
THOMAS WILLIAM ROGERS,
WILLIAM ANDREW MARSHALL.